March 24, 1936.  E. J. KEARNEY  2,035,388
TRANSMISSION AND CONTROL MECHANISM FOR MACHINE TOOLS
Original Filed Oct. 11, 1926  2 Sheets-Sheet 1
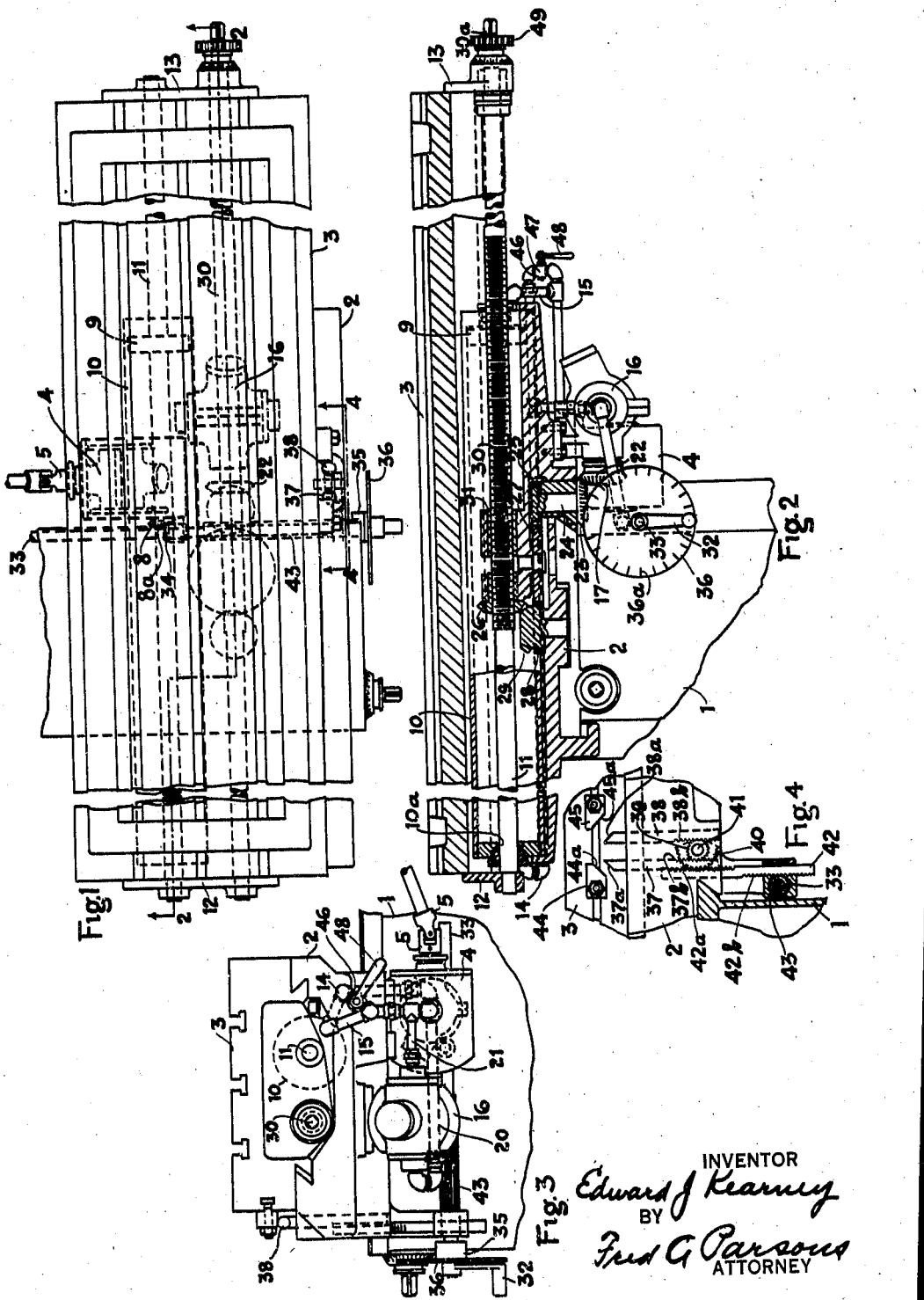

March 24, 1936.  E. J. KEARNEY  2,035,388
TRANSMISSION AND CONTROL MECHANISM FOR MACHINE TOOLS
Original Filed Oct. 11, 1926  2 Sheets-Sheet 2

INVENTOR
Edward J. Kearney
BY
Fred G. Parsons
ATTORNEY

Patented Mar. 24, 1936

2,035,388

UNITED STATES PATENT OFFICE 2,035,388

TRANSMISSION AND CONTROL MECHANISM FOR MACHINE TOOLS

Edward J. Kearney, Wauwatosa, Wis., assignor to Kearney & Trecker Corporation, West Allis, Wis.

Application October 11, 1926, Serial No. 140,754
Renewed January 19, 1931

31 Claims. (Cl. 90—21.5)

This invention relates to means for the movement of machine tool supports and more especially to transmission and control means therefor. It is a main purpose of the invention to provide improved means for support actuation at a great variety of rates of travel although the power source may be of constant rate or speed.

Another purpose is to combine a hydraulic transmission with a mechanical transmission for actuating a movable support in a manner to combine the advantages and eliminate the disadvantages ordinarily inherent in the different methods when used separately.

Another purpose is to provide suitable control means for a support actuated from the combined action of a hydraulic transmission and a mechanical transmission.

Another purpose is to provide combined hydraulic and mechanical means for the actuation of a support in which the mechanical means may be used for manually actuating the support, or for actuating attachments which require to be actuated in correct timing or relative speed, relative to the support movement.

An important purpose is to provide a screw and nut combined with a hydraulic cylinder for support actuation in which the hydraulic means acts to overcome the effect of lost motion due to loose fitting or worn threads in the screw and nut.

Another purpose is to provide a screw and nut for support actuation combined with a hydraulic transmission including a piston and cylinder, and in which the fluid acting on the piston is maintained in correct volume on both sides of the piston throughout the travel of the support to give the effect of a dash pot in reducing support vibration.

Another purpose is generally to simplify and improve the construction and operation of support actuating means for machine tools, and the means for accomplishing the objects previously stated.

Other purposes will be apparent from the following description and claims.

The invention resides in the peculiar construction and arrangement of parts herein clearly shown and described in the drawings and accompanying description and as particularly pointed out in the accompanying claims.

In the accompanying drawings like reference characters have been used to identify the same parts in each of the views.

Fig. 1 is a plan view of a machine tool support having actuating means embodying this invention.

Fig. 2 is a front elevation of the same mechanism as shown in Fig. 1, the upper portion being in section taken along line 2—2 of Fig. 1.

Fig. 3 is an end elevation from the right of Fig. 1.

Fig. 4 shows a portion of a trip mechanism viewed from the line 4—4 of Fig. 1.

Figure 5:
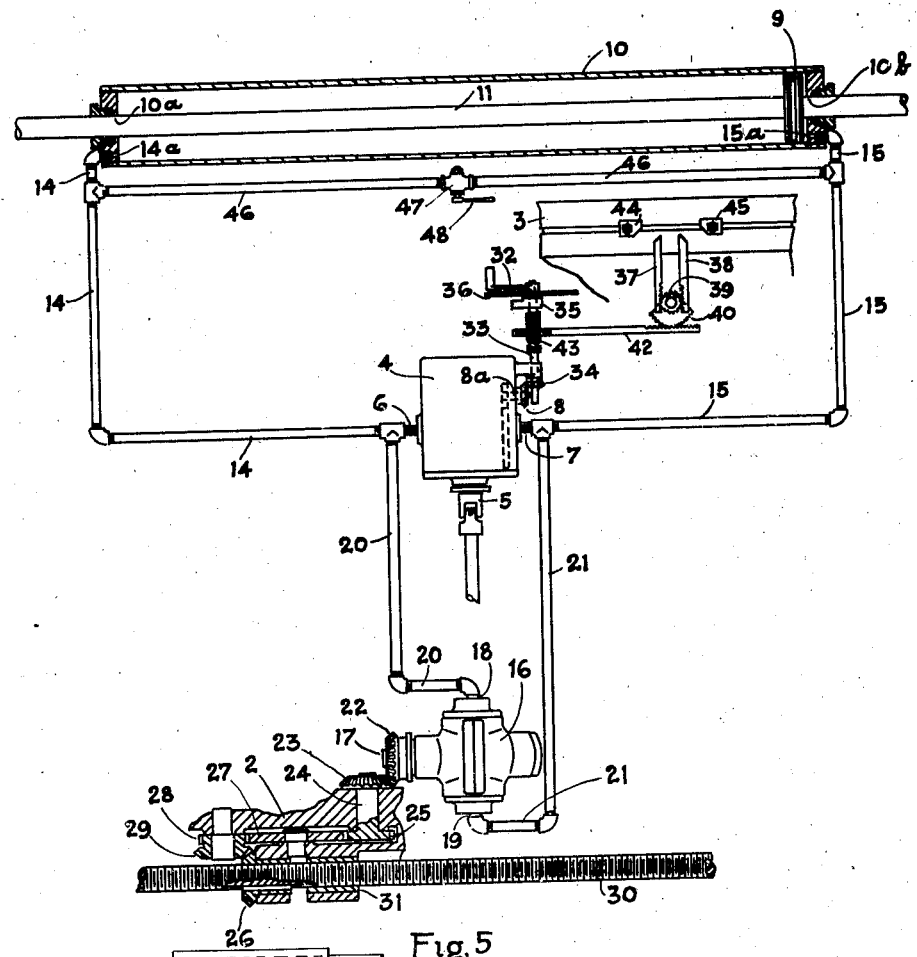
Fig. 5 is a diagrammatic assembly for purposes of explanation and in which some of the parts are not shown in their true relative position or size.
Figure 6:
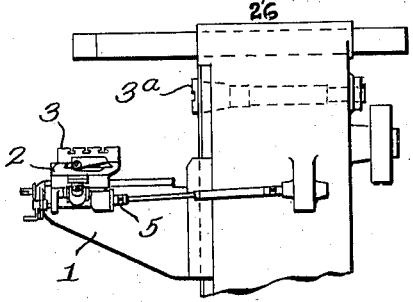
Fig. 6 shows the arrangement relative to the column and spindle in a milling machine structure.

A support 1, of which only a portion is shown, may be the stationary bed of a machine tool, or may be a movable support such as the vertically movable knee of a milling machine as shown in Fig. 6 of well known type. In either event it provides a support for a cutting tool, not shown. Support 1 is provided with a slide in any usual form, by means of which a saddle or support 2 is guided for movement either to right or left in Fig. 3. Saddle 2 is provided with a slide in any usual form, by means of which a table or work support 3 is guided for reciprocatory movement to right or left in Figs. 1 and 2. It will be seen that the table and saddle are movable in directions substantially at right angles whereby table 3 is movable in a plurality of transverse paths relative to support 1. As shown in Fig. 6, when used in a milling machine structure the table 3 is movable in a direction transverse to the axis of a rotary tool spindle 3a. The means for movement of the supports other than table 3 may be of any well known type and therefore are not shown, although they may also be modified forms of the means to be described for moving the table. Fixed on saddle 2 is a pump unit of variable volume type generally denoted by the numeral 4 which is adjustable to give any volume of flow from zero to maximum in either direction when driven in either direction. The pump 4 is of the general form, construction and operation shown and described in a Patent 1,678,050, issued July 24, 1928. The particular pump mechanism, since it forms no part of the present invention and since other and well known forms may be used, is not here shown. The pump 4 will, of course, be chosen to provide a capacity sufficient for the maximum rate of travel required of the table 3. In milling machines there is required a quick traverse rate which is relatively higher than the maximum feed or cutting rate for use in traversing the support in return strokes or in the idle, non-cutting portions of the forward stroke. The pump drive shaft is connected to be driven by a member 5 of an extensible universal joint shaft of well known form connected from any suitable power source such as an electric motor or a drive pulley. Fluid from pump 4 may be forced under pressure either through a pipe or channel 6 (see Fig. 5) connected with the one port of the pump, or through a pipe or channel 7 connected to the other port of the pump, according to the adjustment of a control member projecting from the pump housing, which in this case consists of a bevel gear 8 fixed on the pump control or adjusting shaft 8a. In either event such fluid actuates a plurality of devices, one of which consists of a hydraulic piston 9 having a cooperating cylinder 10 fixed on a saddle 2 in a position such that the travel of piston 9 is parallel with the travel of table 3. A piston rod 11 projects from each end of cylinder 10, being guided in suitable bores 10a and 10b in the cylinder end walls, and the opposite ends of the rod are fixed with brackets 12 and 13, which in turn are fixed with table 3. Thus movement of piston 9 when fluid is supplied to the cylinder 10 will move table 3 relative to the saddle in which it is guided. Fluid may be transmitted from pump 4 to cylinder 10 for movement of piston 9 in the one direction, by the means of the pipe 6 and piping or channels generally denoted by the numeral 14, connecting at the one end with pipe 6 and at the other end with the cylinder bore at 14a; and for movement in the other direction by the means of pipe 7 and piping or channels generally denoted by the numerals 15 connecting at the one end with pipe 7 and at the other end with the cylinder bore at 15a.

The other device which is connected for operation from pump 4 consists of a hydraulic or fluid motor fixed on saddle 2 and generally denoted by the numeral 16. The motor 16 is preferably of a non-adjustable type, adapted for receiving fluid in various volumes or rates of flow and for driving the motor shaft 17 at a speed directly proportional to the rate of fluid flow through the motor. As here shown the motor is of the general form, construction and operation shown and described in a Patent 1,678,049, issued July 24, 1928. The particular motor mechanism, since it forms no part of the present invention and since other and well known forms may be used, is not here shown. Pipes or channels 18 and 19 respectively communicate with the different ports of motor 16 and are connected with the pump by the means of channels generally denoted by the numerals 20 and communicating between the pipes 6 and 18, and channels generally denoted by the numerals 21 and communicating between the pipes 7 and 19, whereby the motor 16 will actuate shaft 17 in either direction accordingly as pump 4 is adjusted to force fluid through pipe 6 or pipe 7. Motor shaft 17 carries a bevel gear 22 fixed thereon and meshing with a bevel gear 23 fixed on a short shaft 24 journaled in the saddle 2. Fixed upon or integral with shaft 24 is a gear 25 which may drive a bevel gear 26 through a train consisting of gears 27, 28, 29 supported from the saddle. The bevel gear 26 is axially parallel with the movement of table 3, and a lead screw 30 is slidable in an axial bore of the shank of the gear but is keyed to revolve with the gear. The screw 30 is journaled at its ends in the brackets 12 and 13 fixed on table 3 but is prevented from axial movement relative to the table in the usual manner. The screw 30 is in threaded engagement with a nut 31 fixed on saddle 2, and by the construction described any rotation of motor shaft 17 will rotate lead screw 30, causing an axial translation of the screw and movement of table 3 connected therewith.

It will be noted that both the piston 9 and the screw 30 are connected for movement of table 3 from pump 4. The relationship of the fluid channels leading from pump 4 to the cylinder 10 and to the motor 16, taken in connection with the mechanical trains from piston 9 and from motor 16 to the table, is such that both the piston 9 and the screw always tend to move the table in the same direction, although the direction of table movement may be changed by the suitable adjustment of pump 4 or may be stopped entirely if the pump is adjusted to a central or zero position.

Means for the manual adjustment of pump 4 are provided as follows. Reference to the Patent 1,678,050 mentioned above will show that in this type of pump, adjusting shaft 8a has a central position corresponding to a zero fluid flow and has movement in either direction from such central position to positions giving maximum fluid flow in a direction corresponding to the direction of adjusting shaft movement, or giving any intermediate rate of flow in either direction according to the position of adjustment. The pump adjusting shaft 8a is connected to a hand lever 32, by the means of a shaft 33 on which the lever 32 is fixed, and which is slidably keyed within an axial bore of a bevel gear 34, which meshes with gear 8 on the adjusting shaft. The shaft 33 is journaled on a bearing 35 on the support 1 and is fixed against axial movement relative thereto. Bevel gear 34 moves with pump 4 and saddle 2 but shaft 33 is of sufficient length to retain its keyed engagement with gear 34 in any position of saddle movement. A plate or dial 36 fixed on support 1 in such position that lever 32 travels adjacent its face, may be provided with indicating lines as shown at 36a, whereby the pump adjustment corresponding to different rates of table travel may be read from the movement of the lever over the face of the dial. It is also contemplated that stops (not shown) may be applied to the face of the dial by any well known means, against which lever 32 may be moved to readily duplicate a desired adjustment of pump 4 when the operation of the machine requires movement from a given adjustment, and a later return to the same adjustment.

Means for the control of the pump adjustment from the movement of table 3 are provided, as follows. A plurality of plungers or control members 37 and 38, are arranged adjacent the front longitudinal edge of table 3, and have racks 37b and 38b meshing with opposite peripheral faces of a gear 39, with which a gear segment 40 is fixed, the gear 39 and segment 40 being pivoted on a stud 41. Segment 40 meshes with rack teeth 42a of a rod 42 having other rack teeth 42b meshed with an elongated pinion 43, fixed upon or integral with shaft 33, the pinion 43 being elongated so that the rack teeth 42b mesh with pinion 43 in any position of the movement of rod 42 with saddle 2. As previously described, shaft 33 controls the pump adjustment and by the above mechanism the plungers 37 and 38 are each moved, but oppositely whenever the fluid flow of the pump 4 is adjusted. The parts are arranged in such a manner that when the pump is adjusted to move table 3 to the right in Figs. 1 and 2, the left plunger 37 rises and the right plunger 38 drops and vice versa. The upper end of the raised plunger is thereby moved into the path of travel of dogs or cam members 44 and 45 which are adjustably fixed on table 3 in any well known manner and have angular cam faces 44a and 45a respectively adapted to contact with angular faces 37a and 38a on the plungers 37—38, during the course of dog movement with the table 3, and thereafter during continued movement to return the plunger contacted to the central or neutral position shown in Fig. 4 which is the position occupied by the plungers when pump 4 is in a position of zero flow adjustment, thus stopping the movement of the table. The lever 32 may later be operated to adjust the pump into its opposite flow to start table movement in the opposite direction but the table movement may not be continued in the same direction until the dog has been removed from the plunger, either by adjustment of the dog on the table or by manual movement of the table and dog together as will be later described.

The dogs 44—45 being of cam form and the action thereof being independent of load and fire devices, the adjustment of the pump therefrom may be made as gradual in its action as may be desired, by the use of less abrupt angular cam faces on the dogs, or the action may by a suitable form of the cam faces, be different in one portion of the pump shifting than in another, and this arrangement also permits that similar dogs, but of total shifting effect not sufficient to shift the pump to neutral, may be used at any intermediate points in the table movement to vary the rate of such movement by operating on the one or the other of plungers 37—38, according to the direction of table movement. The cam dogs 44—45 may also be shifted bodily toward or from the plungers 37—38, or pivoted upon their fastening bolts. By such means a given cam dog may shift the contacted plunger in greater or less amount, or if pivoted, whereby to change the cam angle, may shift the plungers at different rates for a given rate of table travel.

The fluid channels connecting the pump 4 with the cylinder 10 and motor 16 are such that in the normal operation of the mechanism the passages form a closed system. Thus if it be assumed that the pump, motor, cylinder and various passages are filled with fluid the operation of the device merely draws fluid from one portion of the system and delivers it to another portion. For instance, during movement of the table to the right in Figs. 1 and 2 fluid is drawn from the channels 21 and 15 and from the right hand end of the cylinder by the pump, and is delivered through the pump to the pipe 6. There the flow divides, a portion going to the left end of the cylinder to force the piston to the right and a portion going to the motor 16 to be returned to the pump through the motor and channels 21. During opposite table movement the fluid flow through the pump is reversed as previously explained and a similar action takes place, but reversed.

No matter how tight the screw and nut of a machine tool may be originally fitted, looseness will eventually be brought about by wear of the threads, permitting a certain degree of lost motion in the direction of table travel, which ordinarily would permit vibration or chatter under conditions of machine operation such that the load fluctuates, as for instance when using a revolving milling cutter. By the arrangement shown such chatter is avoided or prevented. This is apparent since there is no appreciable resistance to the movement of motor 16 until the screw is turned to bring the threads of the screw against the nut, hence until this happens the motor will accept all or substantially all the fluid delivered by the pump. With contact once established between the screw and nut threads in a direction to resist the table pressure, it will be continuously maintained, since as soon as the contacting thread surfaces tend to separate for any reason there is no resistance between screw and nut and the motor will immediately accept a larger share of fluid, and speed up to prevent loss of thread contact. Thus all lost motion effect between screw and nut is automatically prevented during operation of the table.

It is to be noted that during operation of the table the screw must take some pressure but the amount of such pressure may be and preferably is greatly reduced by the use of the piston. Both the piston and motor being actuated from the same fluid source, each must contribute toward overcoming the total table resistance in direct proportion to the fluid flow diverted to them respectively. Increasing the effective area of piston 10 will increase the relative flow to the cylinder. The relative flow to the motor may be increased either by the use of a motor having a greater fluid capacity per revolution of motor shaft 17, or by changing the ratio of the gear train connecting the motor shaft with the screw 30, to give a greater number of motor shaft revolutions for a given number of revolutions of screw 30. Opposite change in proportion will produce opposite results. Many of the difficulties encountered in machine operation, especially the difficulty of maintaining an accurate product, are the result of wear between lead screw and nut. By the use of the mechanism here disclosed with the parts proportioned to avoid heavy pressures and consequent rapid wear on the screw and nut, the accurate life of the screw and nut may be greatly prolonged although it is preferable to retain sufficient of such pressure that the advantages of screw and nut operation are retained.

The piston 9 and cylinder 10 provide an effective dash pot for preventing or reducing vibration or chatter of the table. Fluid cannot move out of the cylinder at either end of the piston except as controlled by the pump and motor, and since the fluid is substantially incompressible any sudden or vibratory table movement is substantially prevented or deadened, such movement being directly transferred from the piston to the body of fluid and thence directly to the table support. Such action is effective through the entire range of table movement, fluid being automatically maintained in correct volume in substantially closed chambers on each side of the piston by the action of the device as described.

Lead screw 30 is provided with squared end portion 30a to which a crank (not shown) may be applied to turn the lead screw. Such rotation of the screw will rotate the shaft 17 of motor 16, the motor then acting as a pump to transfer fluid from one to the other port of the motor. Since the pump 4 is then always in zero position at which time no fluid may pass through it, such fluid must react on the piston 9 and the arrangement necessary for the operation of the device as previously described is such that the pressure on piston 9, when brought about by motor 16 acting as a pump, tends to move the table in the wrong direction for a given direction of screw rotation. In other words the device is locked against hand movement of the screw. To overcome this condition and permit manual movement of the screw and table, a by-pass is provided consisting of a channel or pipe 46 connecting between the channels 14 and 15, and having a valve 47 of well known construction provided with a handle 48, by means of which the by-pass may be opened to permit manual movement of the table or may be closed to permit power operation of the table as previously described. When the by-pass valve is open fluid displaced by the motor 16, and by movement of piston 9, may circulate freely without material resistance.

The lead screw 30 may be used to actuate attachments of various sorts from a gear 49 removably fixed on the end of the lead screw, which may act as a power coupling to connect with a suitable gear in the power train of such attachment. Thus various attachments may be driven in exact unison with the movement of the table, but such attachments and driving trains therefor, being well known are not shown in the present drawings.

Although the fluid system described has been referred to and in effect , a closed system, provision is made for supplying fluid losses, and for removing air from the system, but since such means in connection with closed fluid systems are well known, such means is not shown here.

It is to be understood that where a movable support is referred to in this specification, the meaning is to be taken to include any member movable for the purpose of relative movement of the work or tool, such as the ram of a broaching machine or other similar members, as well as machine tool tables.

It will be apparent that in the light of this disclosure a variety of modified but equivalent forms of the invention here shown may be constructed by those familiar with the art, each of which it is desired to reserve to the inventor if within the spirit and scope of the following claims.

I claim:

1. In a machine tool the combination of a tool support and a work support, power means for effecting relative movement between said supports including a plurality of fluid operable motors each simultaneously connected for said movement, manual means for said movement, and means adapted to simultaneously by-pass the fluid displaced by said motors.

2. In a milling machine the combination of a saddle, a table reciprocatory thereon, a plurality of devices for reciprocating said table including a piston and a cylinder one of which is fixed with said saddle and the other of which is fixed with said table and including a rotary fluid motor supported from said saddle and connected with said table through gearing, a pump fixed on said saddle, fluid channels simultaneously connecting said cylinder and said motor to receive fluid from said pump, and trip mechanism including a dog adjustably fixed with said table and adapted to interrupt flow of fluid from said pump at a predetermined point of table movement.

3. In a machine tool the combination of a tool support, a work support adjacent said tool support, a transmission for effecting movement of said work support including a reversibly fluid operable motor and a pump adjustable to opposite positions respectively effective to deliver a predetermined flow of fluid in opposite directions to said motor and to another position of no fluid delivery, and control mechanism for said transmission including a dog mounted on said work support for bodily movement therewith, a trip element adjacent said work support and movable into and out of the path of movement of said dog, a motion transmitting connection from said trip element for the adjustment of said pump to one of said opposite positions when said element is moved into said path of dog movement and to said other position when said element is moved out of said path of dog movement, and manual means for effecting the last mentioned movement of said element, said dog being adapted during the course of said bodily movement to shift said trip element out of the path of dog movement whereby to adjust said pump to said other position.

4. In a milling machine the combination of a rotatable tool spindle, a work support movable adjacent said tool spindle and in a direction transverse to the axis thereof, a transmission including in the order recited a drive member, a fluid pump adjustable for variations in rate of fluid output, a rotatable motor connectible to be operated from the fluid delivery of said pump, and gearing driven from said motor for effecting movement of said work support, power control mechanism for said transmission including an element adjacent said work support and movable to control the adjustable pump and thus the fluid delivery to said motor, a member fixed on said work support for bodily movement therewith and adapted during said bodily movement to shift said element, and a manual controller for shifting said adjustable pump and operable independently of said power control mechanism.

5. In a milling machine the combination of a rotatable tool spindle, a work support movable adjacent said spindle and in a direction transverse to the axis thereof, a transmission including in the order recited a drive member, a fluid pump adjustable for variations in rate of fluid output, a rotatable motor connectible to be operated from the fluid delivery of said pump, and a screw and nut one of which is rotatably driven from said motor and the other of which is connected for effecting said movement of said work support, power control mechanism for said transmission including a member fixed on said work support for movement therewith, an element adjacent said work support and movable from movement of said member, and a motion transmitting connection from said element to said adjustable pump for controlling the fluid delivery to said motor, and a manual controller for shifting said adjustable pump and operable independently of said power control mechanism.

6. In a machine tool the combination of a tool support, a work support reciprocably movable adjacent said tool support, a transmission including in the order recited a drive member, a fluid pump adjustable for variations in rate of fluid output, a rotatably fluid operable motor reversibly operable from the fluid delivery of said pump and gearing driven in the one or the other direction from said motor for effecting the one or the other direction of movement of said work support; and control mechanism for said transmission including a plurality of dogs spaced apart on said support and bodily movable therewith, a trip means providing different portions each movable into and out of the path of movement of one of said dogs, and motion transmitting connections from said trip means to said adjustable pump for controlling the fluid delivery to said motor to effect the one direction of motor rotation when one of said portions is positioned in the path of dog movement, and for effecting the other direction of motor rotation when the other of said portions is positioned in the path of dog movement.

7. In a milling machine the combination of a rotatable tool spindle, a work support movable adjacent said tool spindle in a direction transverse to the spindle axis, a power transmission including in the order recited a drive member, a fluid pump, a rotatable motor connected to be operated from the fluid delivery of said pump, and a screw and nut, one of which is rotatably driven from said motor and the other of which is connected for effecting movement of said work support, control means for said transmission including dog operated power devices for control of fluid delivery from said pump to said motor in accordance with the movement of said work support, and a manually operable transmission for movement of said work support and including said screw and nut.

8. In a milling machine, the combination of a rotatable tool spindle, a work support movable in a direction transverse to the axis of said spindle, transmission mechanism movement of said work support including a plurality of trains one of which comprises relatively rotatable screw and nut means and the other of which comprises relatively reciprocatory piston and cylinder means, said trains being simultaneously operative for said bodily movement to be determined in part from the relative rotation of said screw and nut and in part from the relative reciprocation of said piston and cylinder, means for simultaneously rendering both said trains ineffective; and control mechanism for said transmission including a single rate change device simultaneously determinative of the rate of movement of both said trains, and a power trip device including a dog movable in accordance with said bodily movement and motion transmitting connections operative from said dog to shift said means.

9. In a milling machine, the combination of a rotatable tool spindle, a work support reciprocably movable in a direction transverse to the axis of said spindle, transmission mechanism for said reciprocatory movement including a plurality of trains one of which comprises gearing and the other of which comprises a fluid operable motor, said trains being operative for said relative movement to be simultaneously determined in part from the one train and in part from the other train, means for simultaneously rendering both said trains ineffective, a single rate changer simultaneously determinative of the rate of movement of both said trains, and a power trip device including a dog movable in accordance with said relative movement and motion transmitting connections operative from said dog to shift said means.

10. A machine tool comprising a movable support, means for movement thereof including a fluid operable motor connected for support movement, a fluid pump connected for actuating said motor, said pump being adjustable to change the rate of said movement through various positions productive of a fast rate, a slow rate and a variety of intermediate rates, and a control device operable to adjust said pump from one to another of said positions including means determinative of the rate of pump adjustment in part from the rate of said movement and in part from the form of an element of said control means.

11. A machine tool comprising a movable support, means for movement thereof including a fluid pump adjustable through a variety of positions to change the volume of fluid delivery therefrom, whereby to effect corresponding changes in the rate of support movement, a control element movable with the adjustment of said pump through a corresponding variety of positions, and means adapted during the movement of said support to automatically shift said element from one to another of said positions, said means including a portion determinative of the rate of element adjustment in part from the rate of movement of said support and in part from the form of an element of said portion.

12. A machine tool comprising a movable support, a fluid operable piston connected for support movement, a fluid motor having a rotatable shaft, transmission mechanism connecting said shaft with said support, a rotatable member connected to be rotated from said shaft, means for simultaneously supplying fluid both to said piston and to said motor, said rotatable member being provided with a coupling portion adapted for actuation of an attachment, whereby such attachment may be actuated in unison with the movement of said support, and trip mechanism including a dog adjustably fixed with said support and adapted to interrupt said flow of fluid at a predetermined point in support movement.

13. In a machine tool the combination of a tool support, a work support adjacent said tool support, a transmission for effecting movement of said work support including a fluid operable motor and a fluid pump connected with said motor and adjustable for altering the rate of motor actuation; and control means for said transmission including an element movable adjacent said work support and a motion transmitting connection from said element for adjustment of said pump, a member fixed with said work support and bodily movable therewith, and manual means for movement of said element, said member being adapted during the course of said bodily movement to contact and move said element at a rate in part determined by the form of said member and in part determined by the rate of said bodily movement.

14. In a milling machine, the combination of a rotatable tool spindle, a work support movable in a path transverse to the axis of said spindle, transmission mechanism for movement of said support including a fluid operable motor, a fluid source therefor and means adjustable through a variety of positions productive of a high rate, a low rate and various intermediate rates of fluid flow from said source to said motor, and control mechanism for said transmission including a movable element and motion transmitting connections from said element to said adjustable means, and power means for adjustment of said element including a member movable in accordance with the rate of movement of said support and a portion formed to in part determine the rate of adjustment of said element.

15. In a milling machine, the combination of a rotatable tool spindle, a work support movable in a path transverse to the axis of said spindle, a transmission for movement of said work support including a fluid operable motor having a rotatable shaft, a fluid pump for actuation of said motor, a screw and nut element one of which is connected for rotation from said motor whereby to move said support, a rotatable coupling element connected to be also driven from said shaft and adapted for actuation of an attachment, whereby such attachment may be actuated in exact correspondence with the movement of said support, and trip mechanism including a dog adjustably fixed with said support and adapted to interrupt flow of fluid from said pump to said motor at a predetermined point in support movement.

16. In a milling machine the combination of a rotatable tool spindle, a work table movable adjacent said spindle and in a path transverse to the axis thereof, a transmission mechanism for said work table movement and alternatively operable for a quick traverse rate or for one of various relatively slow feed rates, said feed rates including a high rate, a relatively low rate, and a plurality of intermediate rates, said transmission including a rate changer adjustable into various positions collectively determinative of all of said feed rates and respectively determinative of different of said feed rates; a control mechanism for said transmission including means controlling said alternative operation for feed or quick traverse rate, a member adjustable with said rate changer into any of said various positions thereof, and means fixed with said table for shifting said member for effecting some of said various positions of rate changer adjustment.

17. In a milling machine the combination with a support and a table mounted for movement on the support, of a transmission mechanism for said work table movement and alternatively operable for a quick traverse rate or for one of various relatively slow feed rates, said feed rates including a high rate, a relatively low rate, and a plurality of intermediate rates, said transmission including a rate changer adjustable into various positions collectively determinative of all of said feed rates and respectively determinative of different of said feed rates; a control mechanism for said transmission including means controlling said alternative operation for feed or quick traverse rate, a member adjustable with said rate changer into any of said various positions thereof, and means operative in accordance with the movement of said table for shifting said member whereby to adjust said rate changer.

18. In a machine tool the combination with a support and a table mounted for translation on the support, of an hydraulic drive mechanism for said work table movement and alternatively operable for a quick traverse rate or for one of various relatively slow feed rates, said feed rates including a high rate, a relatively low rate, and a plurality of intermediate rates, said transmission including a rate changer adjustable into various positions collectively determinative of all of said feed rates and respectively determinative of different of said feed rates; a control mechanism for said transmission including means controlling said alternative operation for feed or quick traverse rate, a member adjustable with said rate changer into any of said various positions thereof, and means fixed with said table for shifting said member during table movement.

19. In a milling machine, the combination of a horizontally movable work table, a supporting structure therefor, a rotatably movable tool spindle at a level above said table and axially transverse to the path of table movement, said structure providing a spindle supporting portion uprising adjacent a longitudinal edge of said table at one side of a vertical plane passing through said edge, a transmission for one of said movements driven at a substantially constant rate and operable for a variety of rates including a fast rate, a relatively slow rate, and a plurality of intermediate rates, said transmission including a rate changer driven from said power source and adjustable into various positions respectively for effecting different of said rates; and control mechanism for said transmission including a member movable for adjustment of said rate changer, means movable in acordance with movement of said table for shifting said member, said control mechanism including means operable for manually adjusting said rate changer and having a portion exposed for manual operation at the other side of said vertical plane, a chart having markings respectively representing different adjustments of said rate changer, and means visibly indicating said adjustments on said chart.

20. In a milling machine the combination with an upstanding column, of a work table supported for translation with respect to the column, a rotatably movable tool spindle supported from said column at a level above said table and axially transverse to the path of table movement, said column providing a spindle supporting portion uprising adjacent a longitudinal edge of said table and at one side of a vertical plane passing through said edge, a transmission for one of said movements driven at a substantially constant rate and operable for a variety of rates including a fast rate, a relatively slow rate, and a plurality of intermediate rates, said transmission including a rate changer adjustable to various positions respectively determinative of different of said rates; and control means operable to adjust said rate changer into various positions respectively productive of different of said rates including means movable with said table and manual means having a portion exposed for manual operation at the other side of said vertical plane, a chart having markings respectively representing different positions of rate changer adjustment, and means visibly indicating on said chart the effect of the operation of said control means.

21. In a milling machine, the combination of a rotatably movable tool support, a support bodily movable adjacent said tool support in a direction transverse to the axis thereof, a transmission for one of said movements driven at a substantially constant rate and operable for a variety of rates including a fast rate, a relatively slow rate, and a plurality of intermediate rates, said transmission including a rate changer adjustable into a variety of different positions collectively productive of all of said rates and respectively determinative of different of said rates; and control mechanism for said transmission including an element fixed with said bodily movable support and operable to adjust said rate changer, said element being adjustable on said support independently of the position of adjustment of said rate changer and in advance of rate changer adjustment and subsequently operable during table movement to effect the rate changer adjustment, a chart having markings respectively representing different positions of adjustment of said rate changer.

22. In a milling machine, the combination of a base, a tool spindle supported from said base for rotative movement, a work table supported from said base for movement in a direction transverse to the axis of said spindle, a power source, a transmission for one of said movements including a rate changer adjustable for altering the rate of such movement, and rate selective means for said rate changer including an element adjustable on said table to predetermine an adjustment of said rate changer and movable with said table to subsequently adjust said rate changer, and a manually movable member controlling the application of power to said table.

23. In a milling machine the combination of a base, a tool spindle supported from said base for rotative movement, a work support supported from said base for movement in a direction transverse to the spindle axis, a transmission for one of said movements and including a rate changer adjustable for a variety of different rates, and rate selective means for said rate changer including an element adjustable on said table to a variety of positions, said table and element being subsequently operable to effect the adjustment of said rate changer predetermined by said element, and power means for driving said transmission and table.

24. A machine tool including a movable support, a power operable hydraulic transmission mechanism for movement of said support, control means operable to interrupt power operation of said support and simultaneously to lock said support against movement in either direction, and manual means operable subsequently to said control means for movement of said support in either direction.

25. A machine tool including a movable support, a power operable hydraulic transmission for forward and reverse movement of said support including fluid channels, control means operable to interrupt power movement of said support and simultaneously to prevent movement of fluid in said channels, and manual means operable subsequent to the operation of said control means for the movement of said support in either of said directions.

26. A machine tool combining a work carrier, a tool carrier, hydraulic means embodying a variable rate device for propelling one of said carriers, an automatic regulator for said device including an element movable in accordance with carrier movement, and an alternative manually operable regulator for said device.

27. In a milling machine the combination of a base, a tool spindle rotatably supported from said base, a table supported from said base for movement in a direction transverse to the axis of said spindle, a transmission for table movement including a fluid operable motor, an adjustable variable volume pump and a closed channel connecting the outlet port of said motor with the inlet port of said pump; and control mechanism for said transmission including both manually operable pump shifting means and a pump adjusting element automatically movable in accordance with table movement.

28. In a milling machine the combination of a base, a tool spindle rotatably supported from said base, a table supported from said base for movement in a direction transverse to the axis of said spindle, a transmission for table movement including a fluid operable motor, an adjustable variable volume pump, reversing means, and channels operative in either direction position of said reversing means to provide a closed passageway from the motor outlet to the pump inlet; and control mechanism for said transmission including both manually operable pump adjusting means, and a pump adjustable member automatically power movable in accordance with the movement of said table.

29. In a milling machine, the combination of a column, a table reciprocably supported therefrom, said column providing a portion uprising at one side of a vertical plane passing through a longitudinal edge of said table, a spindle rotatably supported from said portion and axially transverse to the path of table movement, a transmission for movement of said table including a fluid operable motor and an adjustable pump connectible for motor operation; and control mechanism for said transmission including manually operable pump adjusting means having a portion exposed for manual adjustment at the other side of said vertical plane and automatically operable pump adjusting means including a member movable in accordance with the movement of said table.

30. In a milling machine, the combination of a rotatably movable tool support, a support bodily movable adjacent said tool support in a direction transverse to the axis thereof, a transmission for one of said movements driven at a substantially constant rate and operable for a variety of rates including a fast rate, a relatively slow rate, and a plurality of intermediate rates, said transmission including a rate changer adjustable into a variety of different positions collectively productive of all of said rates and respectively determinative of different of said rates; and control mechanism for said transmission including an element fixed with said bodily movable support and operable during movement thereof to effect adjustment of said rate changer, other means for rate changer adjustment including a manually movable member and a chart having markings respectively representing different positions of said member.

31. A machine tool including a movable support, a power operable hydraulic transmission for forward and reverse movement of said support including a motor, control means operable in accordance with movement of said support to interrupt power movement thereof and simultaneously to prevent movement of fluid to or from said motor, and manual means operable subsequent to the operation of said control means for the movement of said support in either of said directions.

EDWARD J. KEARNEY.